United States Patent
Yuet et al.

(10) Patent No.: US 9,067,664 B2
(45) Date of Patent: Jun. 30, 2015

(54) AUTOMATIC THRUSTER CONTROL OF A MARINE VESSEL DURING SPORT FISHING MODE

(71) Applicant: Caterpillar Inc., Peoria, IL (US)

(72) Inventors: Fu P. Yuet, Simpsonville, SC (US); Hashim Marzuq, Greer, SC (US); Merritt P. Callaghan, Simpsonville, SC (US); Patrick Lee, Greenville, SC (US); Andrew Hutchison, Fountain Inn (SC)

(73) Assignee: Caterpillar Inc., Peoria, IL (US)

( * ) Notice: Subject to any disclaimer, the term of this patent is extended or adjusted under 35 U.S.C. 154(b) by 55 days.

(21) Appl. No.: 13/906,706

(22) Filed: May 31, 2013

(65) Prior Publication Data

US 2014/0352595 A1    Dec. 4, 2014

(51) Int. Cl.
| | |
|---|---|
| *G05D 1/08* | (2006.01) |
| *B63H 25/42* | (2006.01) |
| *B63H 21/21* | (2006.01) |
| *B63H 5/14* | (2006.01) |
| *B63J 3/02* | (2006.01) |
| *B63H 25/46* | (2006.01) |
| *G05D 1/00* | (2006.01) |
| *B63B 39/08* | (2006.01) |
| *G05D 1/02* | (2006.01) |
| *B63H 25/02* | (2006.01) |

(52) U.S. Cl.
CPC ............ *B63H 25/42* (2013.01); *B63B 39/08* (2013.01); *G05D 1/02* (2013.01); *G05D 1/08* (2013.01); *B63H 25/46* (2013.01); *G05D 1/00* (2013.01); *G05D 1/0206* (2013.01); *G05D 1/0875* (2013.01); *Y02T 70/127* (2013.01); *B63H 21/21* (2013.01); *G05D 1/0016* (2013.01); *B63H 21/213* (2013.01); *B63J 3/02* (2013.01); *B63H 2025/026* (2013.01)

(58) Field of Classification Search
CPC ......... G05D 1/00; G05D 1/0016; G05D 1/08; G05D 1/0875; G05D 1/02; G05D 1/0206; B63H 25/42; B63H 21/213; B63H 21/21; B63H 2025/026; B63H 25/46; B63B 39/08; B63J 3/02; Y02T 70/127
USPC ......... 701/21, 116; 440/1, 39, 40; 114/144 R, 114/144 A, 146; 180/333; 318/588
See application file for complete search history.

(56) References Cited

U.S. PATENT DOCUMENTS

| | | | | |
|---|---|---|---|---|
| 3,675,611 | A * | 7/1972 | Glass | 440/40 |
| 3,911,851 | A * | 10/1975 | Canazzi | 440/40 |
| 3,987,744 | A * | 10/1976 | Blumberg et al. | 114/144 B |
| 4,836,809 | A | 6/1989 | Pelligrino | |
| 5,522,335 | A * | 6/1996 | Veronesi et al. | 114/151 |
| 6,325,010 | B1 * | 12/2001 | Gruenwald | 114/151 |

(Continued)

FOREIGN PATENT DOCUMENTS

WO    2006062416    6/2006

*Primary Examiner* — Russell Frejd
(74) *Attorney, Agent, or Firm* — L. Glenn Waterfield; BakerHostetler

(57) ABSTRACT

A marine vessel is disclosed having a control system for automatically controlling thrusters for steering the marine vessel for the purpose of aiding an angler who has hooked a fish. The control system will automatically control the thrusters based on the positions of the propulsion unit control levers if the control levers are split. The control system may also control the thrusters if the propulsion unit control levers have moved past a predetermined threshold. The predetermined threshold can be set by the operator of the marine vessel.

20 Claims, 4 Drawing Sheets

(56) References Cited

U.S. PATENT DOCUMENTS

| | | | |
|---|---|---|---|
| 6,964,590 B1* | 11/2005 | Ha | 440/67 |
| 6,978,729 B2* | 12/2005 | Bertetti et al. | 114/144 R |
| 6,994,046 B2* | 2/2006 | Kaji et al. | 114/144 R |
| 7,121,219 B1* | 10/2006 | Stallings | 114/151 |
| 7,249,568 B1* | 7/2007 | Cultrara | 114/361 |
| 7,389,735 B2* | 6/2008 | Kaji et al. | 114/144 RE |
| 7,530,319 B1* | 5/2009 | Ha | 114/151 |
| 7,644,675 B1* | 1/2010 | Ha | 114/151 |
| 7,883,383 B2* | 2/2011 | Larsson | 440/1 |
| 8,131,412 B2* | 3/2012 | Larsson et al. | 701/21 |
| 2007/0028824 A1* | 2/2007 | Stallings | 114/151 |
| 2008/0004759 A1* | 1/2008 | Cultrara et al. | 701/21 |
| 2009/0197486 A1 | 8/2009 | Szilagyi et al. | |
| 2011/0073029 A1* | 3/2011 | Stasolla et al. | 114/150 |
| 2011/0172858 A1* | 7/2011 | Gustin et al. | 701/21 |

* cited by examiner

AUTOMATIC THRUSTER CONTROL OF A MARINE VESSEL DURING SPORT FISHING MODE

TECHNICAL FIELD

This disclosure relates to automatically controlling a marine vessel in sport fishing applications.

Sport fishing often involves a fisherman, or "angler", using a rod and reel to catch a fish. The angler often fishes from a marine vessel in order to reach a favorable fishing location. When the angler has hooked a substantial fish, it can take a significant amount of effort by the entire crew to catch and bring aboard the fish. The angler engages in a tug-of-war with the fish as it changes location relative to the marine vessel. The operator of the boat must then maneuver the stern of the vessel so that it is oriented toward the fish in order to aid the angler as the fish moves. Typically such a vessel is equipped with special levers, known as "Palm Beach levers", for steering the vessel during sport fishing maneuvers. These levers are located at the operator's station and are designed to be manipulated by the operator who faces the stern of the vessel while manipulating the levers behind him. This manner of maneuvering is hard to master and requires a skilled operator. In addition, sport fishing maneuvering can benefit from the additional thrust provided by bow and/or stern thrusters. However, controls for the bow and stern thrusters are located on a panel located some distance from the Palm Beach levers. Therefore, the operator cannot operate both the Palm Beach levers and the bow/stern thrusters at the same time.

Control systems for maneuvering vessels during docking operations are known. For instance, such a system is disclosed in PCT publication WO200662416 to Ashby et al, published on Jun. 15, 2006, entitled "Propulsion and Control System for a Marine Vessel". Examples such as Ashby et al use a bow thruster for maneuvering the vessel, but are limited to low engine speeds and are not suitable for sport fishing.

Control systems for providing a special mode for sport fishing are also known. For instance, such a system is disclosed in United States Publication No. 2009/0197486, to Szilagyi et al., dated Aug. 6, 2009, entitled "Method and system for maneuvering aquatic vessels." The example disclosed in Szalagyi et al provides for a sport fishing mode that uses high engine speed and high power, but cannot provide the additional maneuverability of bow or stern thrusters.

SUMMARY OF THE INVENTION

A method for steering a marine vessel having a thruster system and a first and second propulsion unit is disclosed. The method comprises receiving a first signal from a left control lever corresponding to a first setting for a first propulsion unit, receiving a second signal from a right control lever corresponding to a second setting for a second propulsion unit and activating said thruster system to produce a clockwise turning moment if the first signal is greater than the second signal and a counter-clockwise turning moment if the second signal is greater than the first signal.

In another aspect, a control system for steering a marine vessel is disclosed. The control system comprises an electronic controller configured to receive a first signal from a left control lever corresponding to a first setting for a first propulsion unit, receive a second signal from a right control lever corresponding to a second setting for a second propulsion unit, and activate said thruster system to produce a clockwise turning moment if the first signal is greater than the second signal and a counter-clockwise turning moment if the second signal is greater than the first signal.

In yet another aspect, a marine vessel having an electronic controller is disclosed. The marine vessel comprises an electronic controller configured to receive a first signal from a left control lever corresponding to a first setting for a first propulsion unit, receive a second signal from a right control lever corresponding to a second setting for a second propulsion unit, and activate said thruster system to produce a clockwise turning moment if the first signal is greater than the second signal and a counter-clockwise turning moment if the second signal is greater than the first signal.

DETAILED DESCRIPTION

Figure 1:
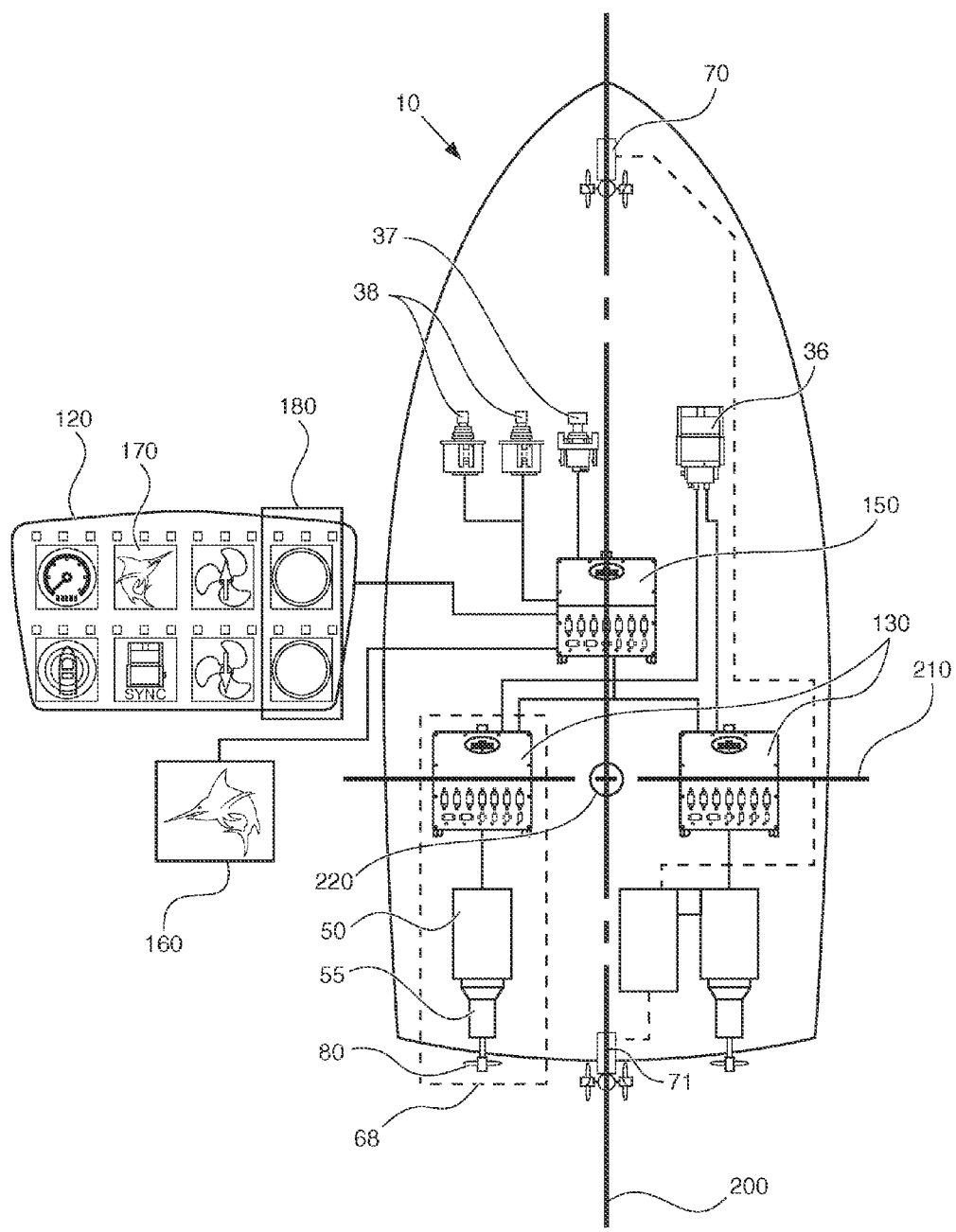
FIG. 1 shows a marine vessel and control system according to the present disclosure.
Figure 2:
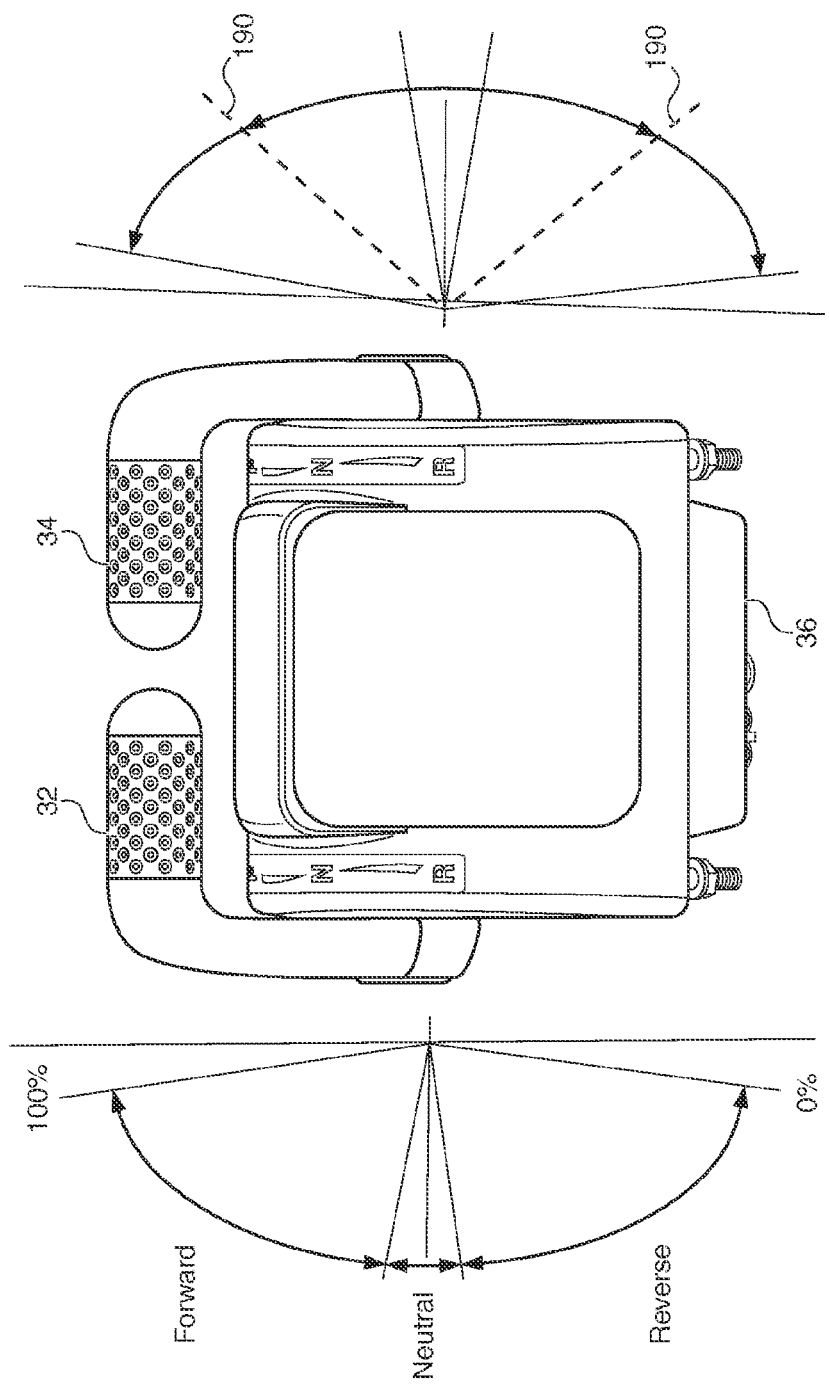
FIG. 2 shows control handle functions according to the current disclosure.

FIG. 1 shows the major mechanical components of a marine vessel 10 according to the present disclosure. The marine vessel 10 includes an operator's station 35 where the major controls of the vessel are located. Such controls include control levers 36, a joystick 37, thruster controls 38, a keypad 120, and a display 160. The controls may be connected via a control area network (CAN) 155. The CAN is of the type that is commonly known in the art, such as J1939. Some or all of the controls may also be located at redundant locations such as a fly bridge 40 or a remote operator's station 45.

The marine vessel 10 includes at least one propulsion unit 68. The propulsion unit 68 includes, at least in part, an engine 50, a transmission 55, a propeller 80, and an electronic propulsion unit controller 130. The propulsion unit controller 130 may control both the engine 50 and transmission 55, or there may be separate propulsion unit controllers 130 for the engine 50 and transmission 55. Multiple propulsion units 68 may be controlled by a master controller 150 by connecting master controller 150 to propulsion unit controllers 130 via a control area network (CAN) 155. The transmission 55 serves to connect the output of the engine 50 to the propeller 80. The transmission 55 has gearing and can operate in forward, reverse, or neutral modes.

Alternatively, the propulsion unit 68 may include a pod 60 instead of a transmission 55. The pod 60 is driven by the engine 50 through a driveshaft 75. The pod 60, also known as an azimuth thruster, contains gearing, steering, and propulsion functions. The pod 60 is made up of two units. The first, the pod upper unit 64, connects to the engine 50 via the driveshaft 75 and contains the gearing and steering functions. The second, the pod lower unit 66, mounts a propeller 80 and provides an exhaust outlet for engine 50. The pod lower unit 66 is external of the hull of the marine vessel 10 and rotates to provide steering.

The marine vessel 10 includes a thruster system 90. The thruster system 90 includes, at least in part, a bow thruster 70, an optional stern thruster 71, and the controllers and systems needed to control and power the thrusters 70, 71. The bow thruster 70 and stern thruster 71 may be powered by motors and may be electrically driven by a controller, such as master controller 150. The master controller 150 controls the thruster system 90 in response to inputs from the control levers 36, the joystick 37, or the thruster controls 38.

In another example, the thruster system 90 may be powered by a hydraulic system 100. The hydraulic system 100 includes, at least in part, a pump driven by the engine 50, and valves that control hydraulic flow to the thrusters 70, 71. The thrusters 70, 71 would be driven by a hydraulic motor which may be integrated into the thrusters 70, 71. The master controller 150 controls the thruster system 90 in response to inputs from the control levers 36, the joystick 37, or the thruster controls 38.

The marine vessel 10 contains at least one operator's station 35 that contains the helm and other functions of the vessel 10. The operator's station 35 includes a set of control levers 36 that provide input for steering and propulsion functions. The control levers 36 include a left control lever 32 and a right control lever 34. A joystick 37 is also included that provides fine steering and propulsion functions for operations such as docking. The speed of the engine(s) 50 is limited to a low idle setting during such operations. The joystick 37 is a two-axis input device that can control the speed of the engine 50, gear selection in either the transmission 55 or pod 60, and the thruster system 90. Moving the joystick 37 to the right commands lateral movement of the marine vessel 10 to the right. Moving the joystick 37 to the forward and right commands movement of the marine vessel 10 both forward and to the right, and so on. Thruster controls 38 are also provided to control the thruster system 90. The thruster controls 38 are typically single-axis input devices that provide individual control of the bow thruster 70 or the stern thruster 71. The speed of the engine(s) 50 is not limited during operation of the thrusters 70, 71. A keypad 120 provides keys or buttons or switches for various functions of the marine vessel 10. Such functions could include engine start, engine mode, fuel system controls, lighting, fire suppression, HVAC, radio, blowers, anchor, bilge pump, generator control, external power, etc. The functions of the keypad 120 could also be fulfilled by a touch screen display or other input device known in the art. The operator's station 35 also includes a display 160 that shows that status of the various functions of the marine vessel 10. Such functions could include engine status, engine mode, navigation, sonar, etc. The functions of the display 160 could also be fulfilled by a touch screen display. It is also conceived that functions of the keypad 120 and display 160 could be combined into a touch screen display.

The control levers 36 include a left control lever 32 and right control lever 34 configured to control each of a left and right side propulsion unit 68. The control levers 36 are multi-axis input devices that can control the speed of the engine 50 and the gear selection in either a transmission 55 or pod 60. The control levers 36 can be used to control the propulsion units 68 to rapidly turn the marine vessel 10 by providing a differential turning moment in addition to the rudder. The propulsion units 68 can provide a turning moment even when the marine vessel 10 is stationary and flow forces are insufficient to allow the rudder to steer the marine vessel 10.

The control levers 36 provide an output that corresponds to a requested speed for engine(s) 50 to master controller 150. The range is defined as 0-100% with the first half roughly corresponding to reverse and the second half corresponding to forward. The neutral position is typically located at 50% but can be varied according to the application. For instance, the forward/reverse according to the current disclosure is 50/50% but could also be 70/30%. A neutral deadband may be included that allows for approximately 15% movement from the neutral position (50%) in either direction without shifting out of neutral. For example, the output ranges may be 0-34% for reverse, 35-65% neutral deadband, and 66-100% forward. The commanded speed of the engine 50 would be proportional to the distance in either direction from the neutral deadband. The output ranges can vary according to the application.

According to the present disclosure, the control levers 36 are configured to additionally control the thruster system 90 when a sportfishing mode key 170 is activated and the control levers 36 are split in their setting. The master controller 150 is configured to detect when the left control lever 32 and the right control lever 34 are moved to different positions relative to each other, thereby commanding a turning moment. The master controller 150, upon detecting the different positions, then commands the thruster system 90 in order to provide an additional turning moment to augment the turning moment provided by the propulsion systems 68. Unlike the joystick 37 commands used for docking maneuvers, the sportfishing mode allows for operation of the thruster system 90 when the speed of the engine(s) 50 is higher than idle. Combining the engine 50, transmission 55 or pod 60, and thruster system 90 controls into the control levers 36 at elevated engine speeds provides a level of response not possible with previous systems.

The operator can steer the marine vessel 10 by moving the control levers 36 to different positions thereby commanding different speeds from the engines 50 and possibly a different gear (forward or reverse) from the transmissions 55 or pods 60. The propulsion units 68 provide a turning moment that is equal to the force of the thrust from the propulsion unit 68 multiplied by the distance on the lateral axis 210 from the center of mass 220 of the marine vessel 10. Greater thrust is available when the engine 50 is at a higher speed. Greater thrust means more response in maneuvering the marine vessel 10. Activating the thruster system 90 further increases response. The thrusters 70, 71 provide a turning moment that is equal to the force of the thrust from the thrusters 70, 71 multiplied by the distance on the longitudinal axis 200 from the center of mass 220 of the marine vessel 10.

The marine vessel 10 may also have more than one operator's station. For instance, a redundant set of controls could be located on a fly bridge 40. The function of the fly bridge 40 is to give a view advantageous for navigation or pleasure viewing. Another set of controls could be located at a remote operator's station 45. The function of the remote operator's station 45 could be to give a view advantageous for docking maneuvers. The fly bridge 40 or remote operator's station 45 could therefore have at least one of a set of control levers 36, joystick 37, thruster controls 38, keypad 120, or display 160.

A fisherman, or angler 20, typically fishes from the deck at the stern of the marine vessel 10. Typical angling equipment includes a rod and reel. The reel includes a fishing line with an angled hook at the end for holding bait and hooking a fish 22. The angler 20 may fish from either a seated or standing position.

Figure 3:
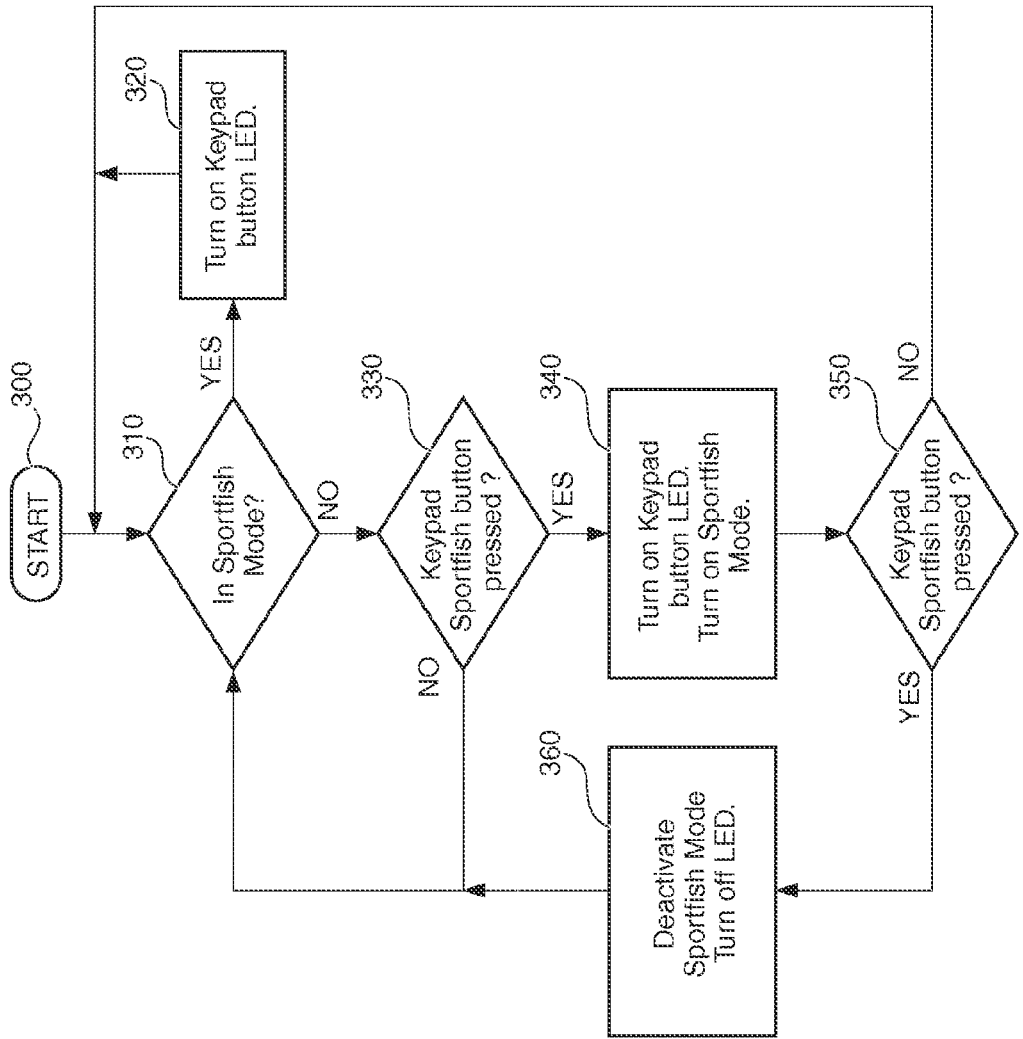
FIG. 3 shows a flow chart according to the current disclosure.

The sportfishing mode is activated by pressing the sportfishing mode key 170. FIG. 3 shows the process for activating sportfish mode and providing an indication that the sportfishing mode is active. The process shown in FIG. 3 is executed in master controller 150. The process starts with box 300 and proceeds to decision box 310 where the process checks to see if sportfishing mode is already active. If yes the process proceeds to action box 320 and a light on the keypad 120 is activated. The process could also activate an icon on display 160. If no at decision box 310, the process proceeds to decision box 330 where the process checks to see if the sportfishing mode key 170 has been pressed. The sportfishing mode key 170 could be a key on the keypad 120 or a soft key on display 160 or an icon on display 160. If yes at decision box 330, the proceeds to action box 340 where a light on the keypad 120 is activated and the sportfishing mode is activated. If no at decision box 330, the process proceeds to decision box 310. From action box 430, the process proceeds to decision box 350 where the process checks to see if the sportfishing mode key 170 has been pressed. If yes, the process proceeds to action box 360 where the sportfishing mode is deactivated and the light on keypad 120 is turned off. The process then proceeds to decision box 310. If no at decision box 350, the process proceeds to decision box 310. The sportfishing mode key 170 may be configured to be activated when pressed for at least 100 ms and deactivated when pressed for another 100 ms.

Figure 4:
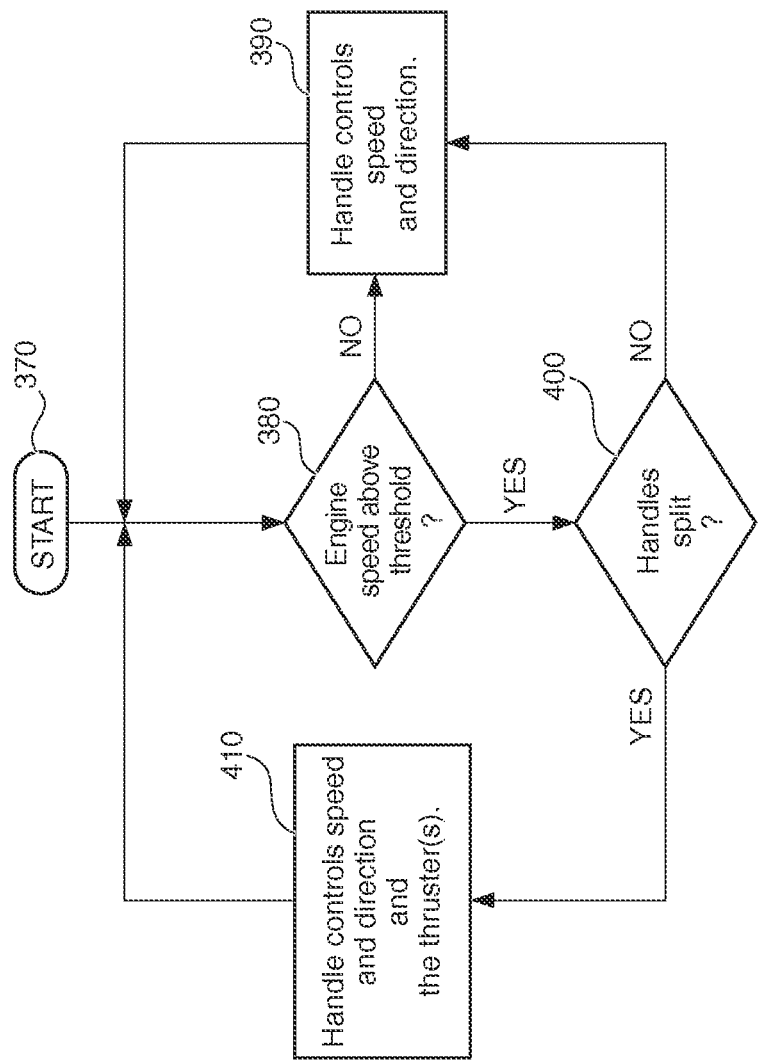
FIG. 4 shows a second flow chart according to the current disclosure.

FIG. 4 shows the process for activating the thruster system 90 in response to the signals from control levers 36. The process shown in FIG. 4 is executed in master controller 150. The process starts at box 370 and proceeds to decision box 380 where the process checks to see if the signals from control levers 36 are above the threshold 190. The signals from control levers correspond to the engine speed and transmission setting requested by the operator. If yes at decision box 380, the process proceeds to decision box 400 where the process checks to see if the left control lever 32 and right control lever 34 signals are split. If yes at 400 the process proceeds to action box 410 where the control levers 36 control both the propulsion units 68 and the thruster system 90. The process then returns to decision box 380. If no at decision box 380, the process proceeds to action box 390, where the control levers 36 control only the propulsion units 68. The process then returns to decision box 380.

INDUSTRIAL APPLICABILITY

The present disclosure relates to a method and control system for steering a marine vessel 10. The marine vessel 10 is a vessel that is specially equipped for sport fishing, or angling. The marine vessel 10 includes a small crew, including a captain, in addition to the angler 20. The captain of the ship often serves as the operator of the marine vessel 10. The captain operates the vessel from the helm while the angler 20 is typically located at the stern of the marine vessel 10.

The operator will typically operate the marine vessel 10 in a low speed cruise mode while the angler 20 is actively fishing. If a fish 22 is hooked, the operator will typically use control levers 36, which control the speed of the engines 50 and the direction of the transmission 55 or pod 60. The operator can move the control levers 36 separate from each other in order to command a turning moment for the marine vessel 10 in order to keep the stern pointed at the fish 22. The turning moment is provided by differential thrust by the propulsion units 68. Sportfishing maneuvers require maximum maneuverability from the marine vessel 10 and therefore require large amounts of power from the engines 50. It can be seen that the maneuverability of the marine vessel 10 would benefit from the thruster system 90 during sportfishing maneuvers. Therefore, according to the present disclosure, command of the thruster system 90 is integrated into the control levers 36.

In order to enable control of the thruster system 90, the operator will push a sportfishing mode key 170 on the keypad 120 or the display 160. Once the sportfishing mode is active, the controllers 130, 140, or 150 may check to determine whether any sensor faults are active. If any faults are active, the sportfishing mode will be deactivated. When sportfishing mode is enabled, the propulsion units 68 and thruster system 90 work together in order to increase the steering response of the marine vessel 10. If sport fishing mode is active and the master controller 150 detects a split, or different signal levels, between the left control lever 32 and the right control lever 34, the master controller 150 commands the thruster system 90 to provide a turning moment to augment the turning moment provided by the propulsion units 68. If the signal from the left control lever 32 is greater than the signal from the right control lever 34, the thruster system 90 will provide an additional clock-wise (CW) turning moment. If the signal from the right control lever 34 is greater than the signal from the left control lever 32, the thruster system 90 will provide an additional counter-clock-wise (CCW) turning moment. In one aspect of the disclosure, the master controller 150 may only activate the thruster system 90 if the signal from the left control lever 32 and the right control lever 34 differ by a tolerance. The tolerance may be pre-programmed into the master controller 150 or maybe user-definable and input through either keypad 120 or the display 160. The additional turning moment from the thruster system 90 may be accomplished by using only the bow thruster 70. A stern thruster 71, if equipped, may provide an additional turning moment. Table 1 below further illustrates the function of the sportfishing mode according to the current disclosure. Signals are represented as percentages and are defined as in a previous portion of this disclosure. "CW" is clock-wise and "CCW" is counter-clock-wise.

| Left Signal | Right Signal | Bow Thruster | Stern Thruster |
| --- | --- | --- | --- |
| 100% | 100% | Off | Off |
| 50 | 100 | CCW | CCW |
| 100 | 50 | CW | CW |
| 0 | 50 | CCW | CCW |
| 0 | 0 | Off | Off |

If the master controller 150 detects a split, or different signal levels, between the left control lever 32 and the right control lever 34, the master controller 150 may compare the highest of the two signals to a threshold 190. If the highest of the two signals is above the threshold 190, then the master controller 150 commands the thruster system 90 to provide a turning moment to augment the turning moment provided by the propulsion units 68. The magnitude of the threshold 190 is measured by determining the distance of the signal from either of the control levers 36 from the center of the neutral position, typically 50%. For instance, a 30% signal from the left control lever 32 would be equivalent to a 70% signal from the right control lever 34.

The threshold 190 ensures that the thruster system 90 will not activate during sportfishing mode unless the speed of the engine(s) 50 requested by the operator is above a certain level. The threshold 190 may be factory programmed into the master controller 150. The threshold 190 may also be user selectable by the threshold selector 180. The threshold selector 180 may be an input on keypad 120, a soft key on display 160, or an icon on display 160 if the display 160 uses touch screen technology. The threshold 190 may therefore be set by the operator according to his confidence or preference.

What is claimed is:
1. A method for steering a marine vessel having a thruster system and a first and second propulsion unit comprising:
receiving a first signal from a first control lever corresponding to a first setting for a first propulsion unit;
receiving a second signal from a second control lever corresponding to a second setting for a second propulsion unit; and activating said thruster system to produce a clockwise turning moment if the first signal is greater than the second signal and a counter-clockwise turning moment if the second signal is greater than the first signal.

2. The method of claim 1 wherein said thruster system includes a bow thruster.

3. The method of claim 1 wherein said thruster system includes a stern thruster.

4. The method of claim 1 wherein said thruster system is activated in response to the first or second signal above a predetermined threshold.

5. The method of claim 4 wherein said threshold corresponds to an engine speed.

6. The method of claim 4 wherein said threshold is selected by a user.

7. The method of claim 4 wherein said thruster system includes a bow thruster.

8. The method of claim 4 wherein said thruster system includes a stern thruster.

9. A control system for steering a marine vessel comprising:
an electronic controller configured to
receive a first signal from a first control lever corresponding to a first setting for a first propulsion unit;
receive a second signal from a second control lever corresponding to a second setting for a second propulsion unit; and
activate a thruster system to produce a clockwise turning moment if the first signal is greater than the second signal and a counter-clockwise turning moment if the second signal is greater than the first signal.

10. The control system of claim 9 wherein said thruster system includes a bow thruster.

11. The control system of claim 9 wherein said thruster system includes a stern thruster.

12. The control system of claim 9 wherein said thruster system is activated in response to the first or second signal above a predetermined threshold.

13. The control system of claim 12 wherein said threshold corresponds to an engine speed.

14. The control system of claim 12 wherein said threshold is selected by a user.

15. The control system of claim 12 wherein said thruster system includes a bow thruster.

16. The control system of claim 12 wherein said thruster system includes a stern thruster.

17. A marine vessel comprising:
an electronic controller configured to
receive a first signal from a first control lever corresponding to a first setting for a first propulsion unit;
receive a second signal from a second control lever corresponding to a second setting for a second propulsion unit; and
activate a thruster system to produce a clockwise turning moment if the first signal is greater than the second signal and a counter-clockwise turning moment if the second signal is greater than the first signal.

18. The marine vessel of claim 17 wherein said thruster system includes a bow thruster.

19. The marine vessel of claim 17 wherein said thruster system includes a stern thruster.

20. The marine vessel of claim 17 wherein said thruster system is activated in response to the first or second signal above a predetermined threshold.

* * * * *